United States Patent
Haddad et al.

(10) Patent No.: US 9,612,854 B2
(45) Date of Patent: Apr. 4, 2017

(54) SYSTEM AND METHOD FOR VIRTUALIZING A REMOTE DEVICE

(71) Applicant: TELEFONAKTIEBOLAGET L M ERICSSON (PUBL), Stockholm (SE)

(72) Inventors: Wassim Haddad, San Jose, CA (US); Heikki Mahkonen, Santa Clara, CA (US); Ravi Manghirmalani, Fremont, CA (US); Ramesh Subrahmaniam, Fremont, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 304 days.

(21) Appl. No.: 14/165,125

(22) Filed: Jan. 27, 2014

(65) Prior Publication Data
US 2015/0169340 A1    Jun. 18, 2015

Related U.S. Application Data (60) Provisional application No. 61/917,516, filed on Dec. 18, 2013.

(51) Int. Cl.
   *G06F 9/455*    (2006.01)
   *H04L 12/24*    (2006.01)
   *H04L 12/28*    (2006.01)

(52) U.S. Cl.
   CPC ...... *G06F 9/45533* (2013.01); *H04L 12/2898* (2013.01); *H04L 41/0809* (2013.01); *Y04S 40/162* (2013.01)

(58) Field of Classification Search
None
See application file for complete search history.

(56) References Cited

U.S. PATENT DOCUMENTS

| | | | | |
|---|---|---|---|---|
| 2012/0300615 | A1* | 11/2012 | Kempf | H04W 24/02 370/216 |
| 2012/0324442 | A1* | 12/2012 | Barde | H04L 49/70 718/1 |
| 2014/0029451 | A1* | 1/2014 | Nguyen | H04L 43/50 370/252 |
| 2014/0092907 | A1* | 4/2014 | Sridhar | H04L 45/74 370/392 |

OTHER PUBLICATIONS

OpenFlow Management and Configuration Protocol (OF-Config 1.1.1), Open Networking Foundation, Mar. 23, 2013, Version 1.1.1, the whole document.
OpenFlow Switch Specification, Open Networking Foundation, Oct. 14, 2013, Version 1.4.0 (Wire Protocol 0x05), the whole document.

* cited by examiner

*Primary Examiner* — Dong Kim (57) ABSTRACT

A scheme for virtualizing a remote physical device, e.g., customer premises equipment (CPE), at a cloud-based data center connected to a network. In one embodiment, a virtual switch operating at the CPE is operative to monitor device events at the CPE. When a device is connected to a CPE port, a virtual device port is created that is operative with a Software Defined Network (SDN) architecture. Responsive to an indication that a new SDN-compliant virtual device port is created, an SDN controller is operative to facilitate creation of a data tunnel between the CPE's virtual switch and a virtual switch of the data center.

17 Claims, 7 Drawing Sheets

SYSTEM AND METHOD FOR VIRTUALIZING A REMOTE DEVICE

CROSS-REFERENCE TO RELATED APPLICATION

This application claims priority to U.S. Provisional Application Ser. No. 61/917,516, filed on Dec. 18, 2013, the entire disclosure of which is hereby incorporated herein by reference in its entirety.

FIELD OF THE DISCLOSURE

The present disclosure generally relates to computer and communication networks involving data center virtualization and cloud computing. More particularly, and not by way of any limitation, the present disclosure is directed to a system and method for virtualizing a remote device with respect to a data center disposed in a Software Defined Networking architecture.

BACKGROUND

Virtualization and Software Defined Networking (SDN) are being utilized in a number of technological settings. By way of illustration, an emerging trend is architecting large-scale, cloud-centric data centers based on SDN and virtualized resources. There are several issues with respect to such implementations, however. For example, providing access for virtualized machines executing on data centers to a remote physical device or resource connected in a wide area packet-switched network (e.g., the Internet) is fraught with difficulties relating to, among others, having to support several different protocols, multitude devices and management schemes, and cumbersome protocol parsing techniques.

SUMMARY

The present patent application discloses systems, methods, apparatuses and associated computer-readable media having executable program instructions thereon for virtualizing a remote physical device, e.g., any Internet-connected appliance or customer premises equipment (CPE), at a cloud-based data center connected to a network. In one embodiment, a method operating at a CPE comprises, inter alia, monitoring device events by a virtual switch operating at the CPE. Such device events may comprise, without limitation, connecting a physical device to a suitable port of the CPE, effecting read/write operations thereat, etc., for example. Responsive to detecting that a physical device is connected to a CPE port, a virtual device port is created in the virtual switch that is operative with a Software Defined Network (SDN)-based infrastructure architecture within which one or more data centers may be disposed. An indication may be provided to an SDN controller to which the data centers are coupled that a new SDN-compliant virtual device port in the CPE's virtual switch is created, whereupon the SDN controller is operative to facilitate creation of a data tunnel between the CPE's virtual switch and a virtual switch of a select data center that is accessible via a wide area packet-switched network, e.g., the Internet.

In another aspect, an embodiment of a CPE is disclosed that comprises, inter alia, one or more processors and one or more memory blocks coupled thereto as well as one or more device ports. The CPE further comprises a virtual switch executing on a platform comprising at least one processor and a memory block, wherein the virtual switch includes a component configured to monitor device events associated with the one or more device ports of the CPE. The virtual switch further comprises a component, operative responsive to detecting that a device is connected to a device port of the CPE, configured to create a corresponding virtual device port adapted to interface with an SDN architecture-based network infrastructure wherein one or more data centers may be disposed. The virtual switch also includes a component configured to transmit an indication to an SDN controller of the SDN architecture-based network, wherein the indication is operative to indicate that a new virtual device port compliant with the SDN is created thereat. The indication is further operative to facilitate creation of a tunnel in the data forwarding plane between the CPE's virtual switch and a virtual switch operating at the data center accessible via a packet-switched network (e.g., the Internet).

In a further aspect, an embodiment of a method operating at an SDN controller is disclosed. The claimed method comprises, inter alia, receiving an indication from a virtual switch executing on a CPE that an SDN-compliant device port is created at the CPE. Responsive to the indication, the SDN controller is operative to send a notification to a device manager that a new device is detected at the CPE, the notification including an identifier of the CPE. The claimed method further comprises receiving tunnel connection information from the device manager for establishing a data tunnel between the CPE's virtual switch and a virtual machine (VM) operating at a data center accessible to the CPE via a packet-switched network (e.g., the Internet), wherein the tunnel connection information comprises at least an identifier associated with the virtual machine and a tag of a Virtual Extensible Local Area Network (VxLAN) in which the virtual machine is logically organized. Responsive to the received tunnel connection information, the SDN controller is operative to configure endpoints for a data tunnel between the CPE's virtual switch and the data center's virtual switch and install one or more SDN-compliant rules for specifying or otherwise controlling data packet flow relative to the data tunnel involving the SDN-compliant device port.

In a still further aspect, an embodiment of a method operating at a data center implemented as an SDN-based virtualized environment of one or more virtual machines is disclosed. The claimed method comprises, inter alia, receiving at a virtual switch of the data center a configuration request from an SDN controller to create a new device port in a particular virtual machine. Responsive to the configuration request, a new device port and associated device file are created, wherein the new device port's name is derived from a tag of a VxLAN in which the particular virtual machine is logically organized. Further, the new device port may be virtualized to the particular virtual machine to appear as connected to the particular virtual machine. In a further implementation, an application executing on the particular virtual machine may be provided with access to the new device port so that data transfer operations relative to the new device port may be effectuated.

In still further aspects, embodiments of non-transitory computer-readable media containing instructions stored thereon are disclosed for performing one or more embodiments of the methods set forth herein when executed by corresponding hardware platforms.

For instance, an embodiment of non-transitory computer-readable medium contains instructions stored thereon which, when executed by a computer system configured to operate as a CPE coupled to an SDN-based infrastructure architecture, facilitate virtualization of a physical device port to a data center accessible via the Internet. The computer-readable medium comprises: a code portion for monitoring device events executing on the CPE; a code portion, responsive to detecting that a device is connected to a port of the CPE, for creating a corresponding virtual device port operative with the SDN architecture; and a code portion for transmitting an indication to an SDN controller, the indication operative to indicate to the SDN controller that a new virtual device port has been created in the CPE's virtual switch, wherein the indication is further operative to facilitate creation of a data tunnel between the CPE's virtual switch and a virtual machine operating at a data center accessible via the Internet. Additional features of the various embodiments are as set forth in the respective independent claims, dependent claims, or a combination thereof.

Advantages of the present invention include, but not limited to, facilitating a VM access to any physical device attached to a wide area packet-switched network such as the Internet, obviating the need for specific protocol parsing between the remote physical device and a data center's VM, among others. As network control and management is provided by the SDN controller and SDN protocol, device management applications may be advantageously configured on top of—or in conjunction with—the SDN controller for open source implementations. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components-based details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscriber end stations or client devices. For purposes of the present patent application, a network element may be deployed in enterprise networks, intranets, extranets, Internet service provider networks, web-based cloud platforms, telecom operator networks, the Internet of Things (IoT) or Internet of Everything (IoE), and the like, and may comprise one or more combinations of the modules and other elements set forth hereinbelow for effectuating virtualization of a remote connected device according to the teachings herein.

One or more embodiments of the present patent disclosure may be implemented using different combinations of software, firmware, and/or hardware. Thus, one or more of the techniques and blocks shown in the Figures (e.g., flowcharts) may be implemented using code and data stored and executed on one or more electronic devices or nodes (e.g., a subscriber/user equipment (UE) device, an end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such elements or nodes may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or data transmission. The coupling of the set of processors and other components may be typically through one or more buses and bridges (also termed as bus controllers), arranged in any known (e.g., symmetric/shared multiprocessing) or heretofore unknown architectures configured to interoperate with any Operating System (OS). Thus, the storage device or component of a given electronic device or network element may be configured to store code and/or data for execution on one or more processors of that element, node or electronic device for purposes of implementing one or more techniques of the present disclosure.

Figure 1:
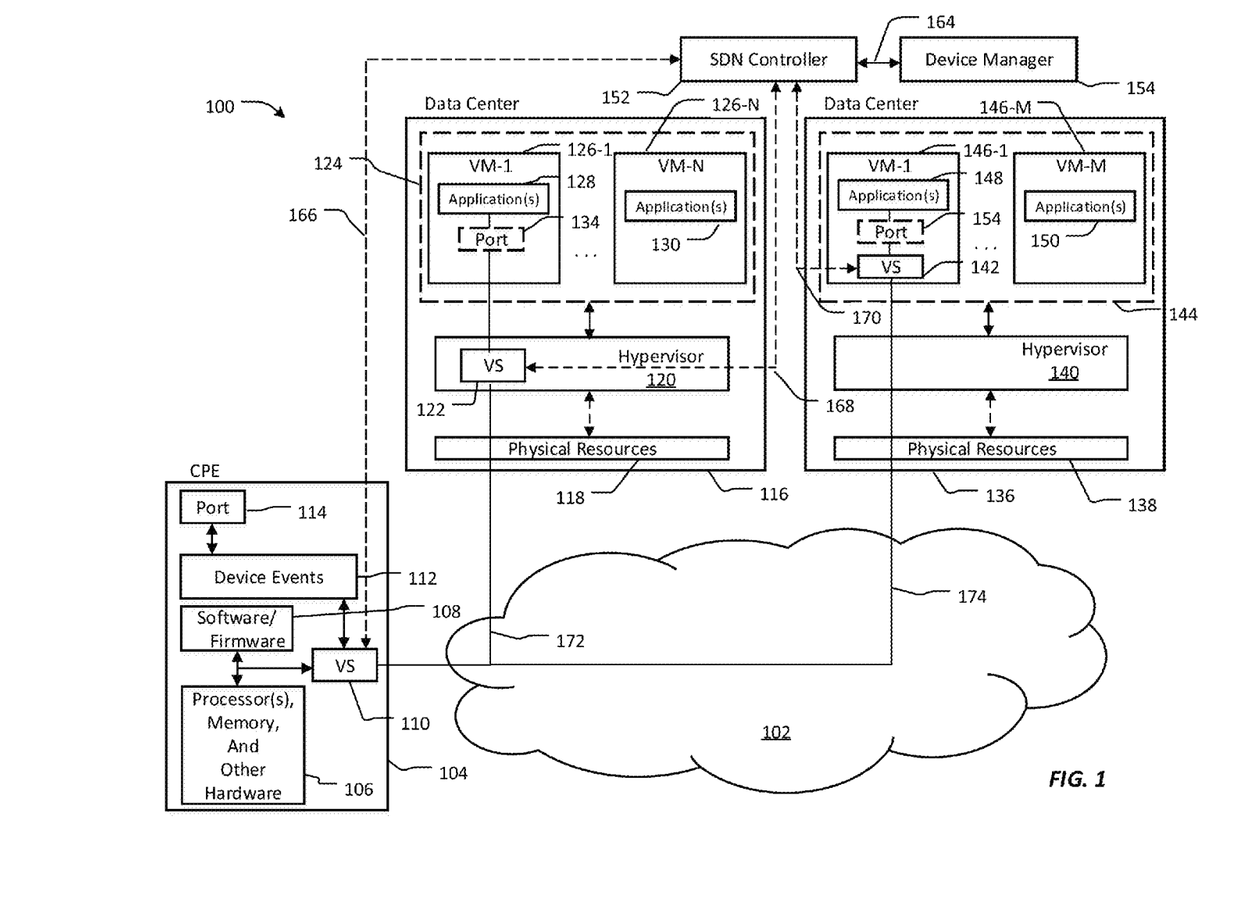
FIG. 1 depicts an example network environment wherein one or more embodiments of the present patent application may be practiced.

Referring now to the drawings and more particularly to FIG. 1, depicted therein is an example network environment 100 wherein one or more embodiments of the present patent application may be practiced. As illustrated, the example network environment 100 is representative of an IoT/IoE arrangement where one or more end stations or customer premises equipment (CPE) 104 are connected to a packet-switched network 102 (e.g., the Internet) for accessing cloud-based resources (e.g., applications, storage, etc.) disposed in one or more data centers 116, 136. As such, the cloud-based data centers 116, 136 may be provided as part of a public cloud, a private cloud, or a hybrid cloud, and for cooperation with CPE 104, may be disposed in a Software Defined Network (SDN) infrastructure architecture using known or heretofore unknown protocols such as, e.g., OpenFlow (OF) protocol, Forwarding and Control Element Separation (ForCES) protocol, OpenDaylight protocol, and the like. An example SDN architecture typically involves separation and decoupling of the control and data forwarding planes of the network elements, whereby network intelligence and state control may be logically centralized and the underlying network infrastructure is abstracted from the applications. One implementation of an SDN-based network architecture may therefore comprise a network-wide control platform, executing on or more servers, which is configured to oversee and control a plurality of data forwarding nodes or switches. Accordingly, a standardized interfacing may be provided between the network-wide control platform (which may be referred to as "SDN controller" 152 for purposes of some embodiments of the present patent application) and the various components such as data centers 116, 136 and CPE nodes 104, thereby facilitating high scalability, flow-based traffic control, multi-tenancy and secure infrastructure sharing, virtual overlay networking, efficient load balancing, and the like.

As SDN-compatible environments, data centers 116, 136 may be implemented in an example embodiment as an open source cloud computing platform for public/private/hybrid cloud arrangements, e.g., using OpenStack and Kernel-based Virtual Machine (KVM) virtualization schemes. As such, data center virtualization may involve providing a virtual infrastructure for abstracting or virtualizing a vast array of physical resources such as compute resources (e.g., server farms based on blade systems), storage resources, and network/interface resources, wherein specialized software called a Virtual Machine Manager or hypervisor allows sharing of the physical resources among one or more virtual machines (VMs) or guest machines executing thereon. Each VM or guest machine may support its own OS and one or more applications, and one or more VMs may be logically organized into a virtual LAN using an overlay technology (e.g., a Virtual Extensible LAN (VxLAN) that may employ VLAN-like encapsulation technique to encapsulate MAC-based OSI Layer 2 Ethernet frames within Layer 3 UDP packets) for achieving further scalability. By way of illustration, data centers 116 and 136 are exemplified with respective physical resources 118, 138 and VMM or hypervisors 120, 140, and respective plurality of VMs 126-1 to 126-N and 146-1 to 146-M. that are logically connected in respective VxLANs 124 and 144. As further illustration, each VM may support one or more applications, e.g., application(s) 128 executing on VM 126-1, application(s) 130 executing on VM 126-N, application(s) 148 executing on VM 146-1, and application(s) 150 executing on VM 146-M, wherein an application may require access to CPE's physical devices such as an I/O device (i.e., a remote device), involving data consumption from the device and/or data generation to the device.

Continuing to refer to FIG. 1, although not specifically shown therein, hypervisors 120, 140 may be deployed either as a Type I or "bare-metal" installation (wherein the hypervisor communicates directly with the underlying host physical resources) or as a Type II or "hosted" installation (wherein the hypervisor may be loaded on top of an already live/native OS that communicates with the host physical infrastructure). Regardless of the hypervisor implementation, each data center 116, 136 may be provided with a respective SDN-compatible virtual switch (VS) 122, 142 (e.g., OpenFlow vSwitch or OVS in one illustrative implementation) that may be adapted for purposes of virtualizing a remote CPE's I/O device within a data center environment as will be described in further detail below. Further, the data center's VS may be deployed either as part of its hypervisor or as part of a VM or guest machine executing thereon. With respect to the latter configuration, it should be appreciated that in some instances a VM's OS may or may not include the capability to support a virtual switch (or specifically an OVS), and accordingly, a VM-based OVS configuration may be somewhat constrained by the OS capabilities. In the configuration of data center 116, VS 122 is provided as part of hypervisor 120, which facilitates remote device port virtualization with respect to any VM-1 to VM-N, whereas in the configuration of the data center 136, VS 142 is deployed as part of a specific VM that has an OVS-capable OS.

For purposes of the present patent application, CPE 104 is an Internet-connected device or Internet appliance that may be deployed in a number of application environments where data may be gathered, sensed, measured, generated, consumed, produced and/or provided to/from cloud-based resources for processing, storage, etc., and may be provided with wireless and/or wireline connectivity in any type of access technologies. Accordingly, CPE 104 is representative of any Internet-connected appliance or physical device and may comprise, without limitation, measurement/instrumentation equipment, sensing equipment, medical device/instrumentation, intelligent home/automobile device/instrumentation, smart metering instrumentation, gaming/home entertaining equipment, computing/communication equipment such as laptops, tablets, desktops, mobile communication devices, and the like. Broadly, CPE 104 comprises one or more processors coupled to one or more memory blocks and other hardware, shown generally at reference numeral 106 and a software/firmware environment 108 for executing various programs, applications, etc. For purposes of input/output interaction, CPE 104 may be provided with one or more device ports 114 that may comprise any number, type and interface functionality, depending of the CPE's application deployment. Consequently, device port(s) 114 is/are representative of at least one of a serial port, a parallel port, a Universal Serial Bus (USB) port, a High-Definition Media Interface (HDMI) port, a Digital Visual Interface (DVI) port, a character device port, a block device port, a FireWire port, a Wireless Home Digital Interface (WHDI) port, a game controller port, a sensor port, and a Digital Living Network Alliance (DLNA)-compliant port, etc. Additionally, an SDN-compatible virtual switch (VS) 110, may be provided as part of the CPE's environment that is configured to monitor device events 112 taking place relative to one or more device ports 114 of CPE 104. As will be seen below, an example embodiment of VS 110 may comprise an OpenFlow vSwitch or OVS for purposes of OF-based implementations.

As part of the SDN-based architecture, VS entities of CPE 104 and respective data centers 116, 136 are operable to communicate with SDN controller 152 via suitable protocol control channels 166, 168 or 170 (e.g., OF protocol control channels in one implementation). A device manager 154 may be provided as part of SDN controller 152 or as a separate entity that communicates with the SCN controller 152 via a suitable interface 164. Among other things, device manager 154 may include connection management/intelligence that may be configured relative to respective CPEs and data centers for purposes of facilitating virtualization of a remote CPE's device port within a correct VM and correct data center. As will be seen below, appropriate data tunnels 172, 174 may be effectuated by the SDN controller between the CPE's and data center's VS entities that allow data flow back and forth between the CPE's device port and the data center's VM as though the remote device port is connected to the particular VM.

A high-level process flow for effectuating remote device virtualization according to an embodiment in the context of the foregoing network arrangement is set forth immediately below. Additional details and applicable message flow diagrams in an OpenFlow implementation will then follow.

When a device is plugged into a device port at the CPE physical machine 104 connected to the Internet, VS 110 monitoring the device events thereat is operative to create a virtual device port for the new device (i.e., the device just plugged into the port). The new virtual device port is operative to bridge data between a special file called device file for the device and the SDN-based network, which is an interface for a device driver that appears in a file system as if it were an ordinary file. Depending on the type of the device/port, the device file can be a character device file or a block device file, for example. Character special files or character devices relate to devices through which the system transmits data one character at a time by, for example, getchar. Block special files or block devices correspond to devices that move data in the form of blocks by, for example, fread, and interface the devices such as hard disks, CD-ROM drives, flash drives, etc.

As SDN controller 152 is notified that a new device port is created by the CPE's VS, a device manager service or application executing in conjunction with SDN controller 152 (e.g., device manager 154) informs the controller where to connect the device, i.e., a particular VM and where the particular VM is hosted (i.e., which data center). It should be appreciated that a particular VM where the device port is to be virtualized may be created dynamically (i.e., on the fly) or already instantiated in the data center. Based on the information received from device manager 154, an SDN tunnel is created between the CPE physical machine and the corresponding data center, which involves creating a virtual device port in the data center's VS. When the data center's hypervisor is aware that the data center's VS has created a new device port, the hypervisor virtualizes it to the particular VM to appear as connected to it (i.e., virtualized as a "physical" device local to the VM). In FIG. 1, ports 134 and 154 are examples of such virtualized ports connected to VM-1 126-1 and VM-1 146-1 at data centers 116, 136, respectively. Thereafter, the VM can perform normal application server I/O operations relative to an appropriate application with the virtualized device whereby data packets are tunneled to/from the real device inside the SDN tunnel.

Figure 2:
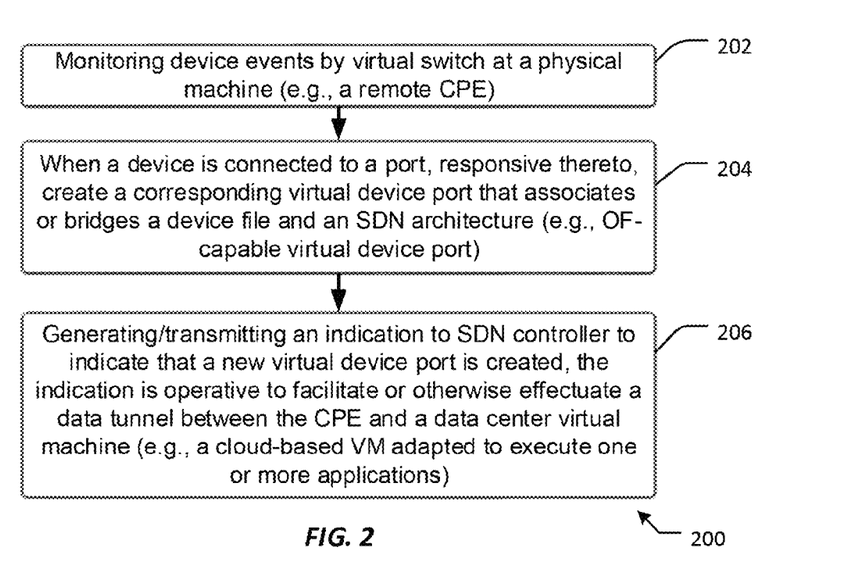
FIGS. 2-4 depict flowcharts with blocks relative to a remote device virtualization methodology according to an embodiment.
Figure 3:
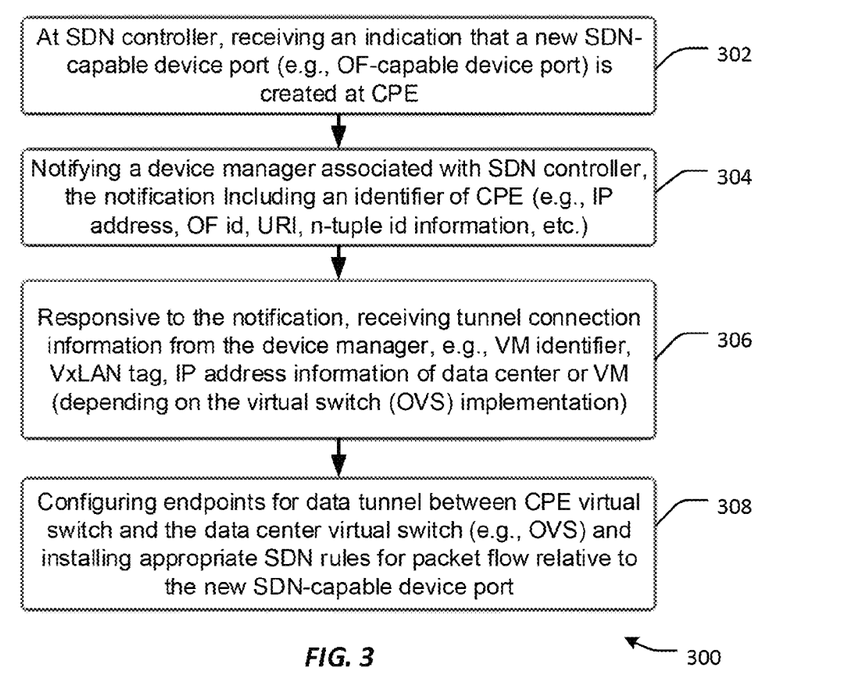
Figure 4:
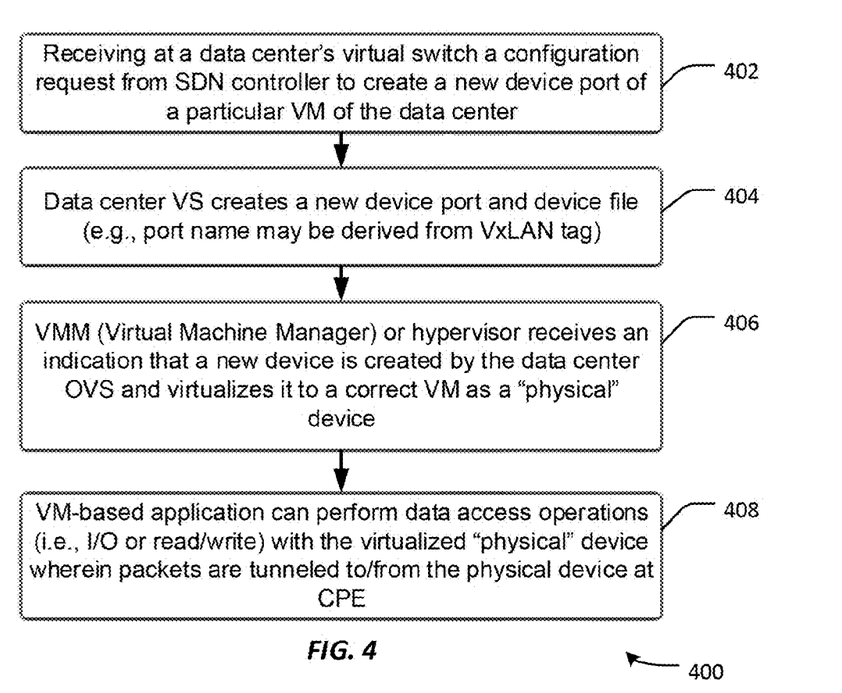

FIGS. 2-4 depict flowcharts with blocks relative to a remote device virtualization methodology according to an embodiment wherein the steps and acts being performed at different entities (e.g., CPE, SDN controller and data center) are segregated for convenience. In particular, reference numeral 200 refers to a process flow operating at a CPE such as, e.g., CPE 104 shown in FIG. 1. A virtual switch associated with the CPE monitors device events taking place thereat (block 202). Responsive to detecting that a device is connected to a device port of the CPE, the virtual switch creates a corresponding virtual device port operative with SDN architecture, e.g., an OF-compliant virtual device port (block 204). Thereafter, the virtual switch executing on the CPE transmits, generates or otherwise provides an indication or notification to an SDN controller wherein the indication is operative to indicate to the SDN controller that a new virtual device port has been created in the CPE's virtual switch. Alternatively or additionally, the SDN controller may obtain a port creation indication via other mechanisms available in the SDN architecture. Regardless of how a port creation indication is obtained, such indication is further operative to trigger a set of acts and corresponding message flows at the SDN controller to facilitate creation of a data tunnel between the CPE's virtual switch and a virtual machine (i.e., a guest machine) operating at a data center (block 206). In one implementation, the SDN-capable new virtual device port may be represented as a device file (e.g., as a Unix-compliant canonical device file). For illustration, where a USB device port is to be virtualized, a device file representation of the new virtual device corresponding to the USB device port may be /dev/ttyUSB0.

FIG. 3 depicts a flowchart relative to a process flow 300 operating at an SDN controller for purposes of remote device virtualization, which commences with receiving or otherwise obtaining an indication from a virtual switch executing on a CPE that an SDN-compliant device port is created at the CPE (more particularly, in the virtual switch thereof) (block 302). Depending on how a device manager is implemented relative to the SDN controller, a notification is transmitted—or otherwise obtained by—a device management application to notify that a new device is detected at the CPE, wherein the notification includes an identifier of the CPE (e.g., its IP address, SDN identity (e.g., OF_id if implemented in OF), a Uniform Resource Indicator (URI), a Uniform Resource Name (URN), a Uniform Resource Location (URL), an n-tuple identity information, and the like), as set forth at block 304. Responsive to the notification, the SDN controller receives tunnel connection information from the device manager for establishing a data tunnel between the CPE's virtual switch and a virtual machine executing or to be instantiated at a data center (block 306). In one implementation, the data center may be accessible via a wide area public packet-switched network such as the Internet. Alternatively, the data center may be disposed in a private cloud network of a service provider, an enterprise, a telco operator, etc. Depending on how the data center's virtualization is implemented (e.g., whether a virtual switch is provided as part of the data center's hypervisor or as part of individual VMs), various pieces of data may be provided as part of the tunnel connection information to the SDN controller. As set forth at block 306, such information may comprise at least one of a VM identifier identifying the correct VM, identity information for a suitable tunneling/overlay technology, e.g. a tag of a VxLAN in which the VM is logically organized, and an IP address of the data center or the data center's virtual switch (if it is provided as part of the VM). Based on the received tunnel connection information, the SDN controller configures endpoints for a data tunnel between the CPE's virtual switch and the data center's virtual switch and installs one or more SDN-compliant rules for controlling data packet flow in the tunnel relative to the SDN-compliant device port created at the CPE (block 308).

Turning to FIG. 4, depicted therein is a flowchart relative to a process flow 400 operating at a data center for purposes of remote device virtualization, which commences with receiving or otherwise obtaining at a virtual switch of the data center a configuration request from an SDN controller to create a new device port in a particular VM of the data center (block 402). Responsive to the configuration request, a new device port and associated device file are created wherein the new device port's name is derived from a VxLAN tag of the VxLAN in which the particular VM may be logically organized (block 404). When the VMM or hypervisor receives an indication or is otherwise made aware that a new device is created by the data center's virtual switch (e.g., OVS), it virtualizes the port to the particular VM so that it appears as though the device is connected to the particular VM (i.e., a local "physical" device) (block 406). Thereafter, an application executing on the particular VM is provided with access to the new device port, i.e., the VM-based application can then perform data access operations (i.e. read/write or I/O operations) with the virtualized "physical" device wherein data packets are tunneled to/from the physical device at the CPE (block 408).

Figure 5:
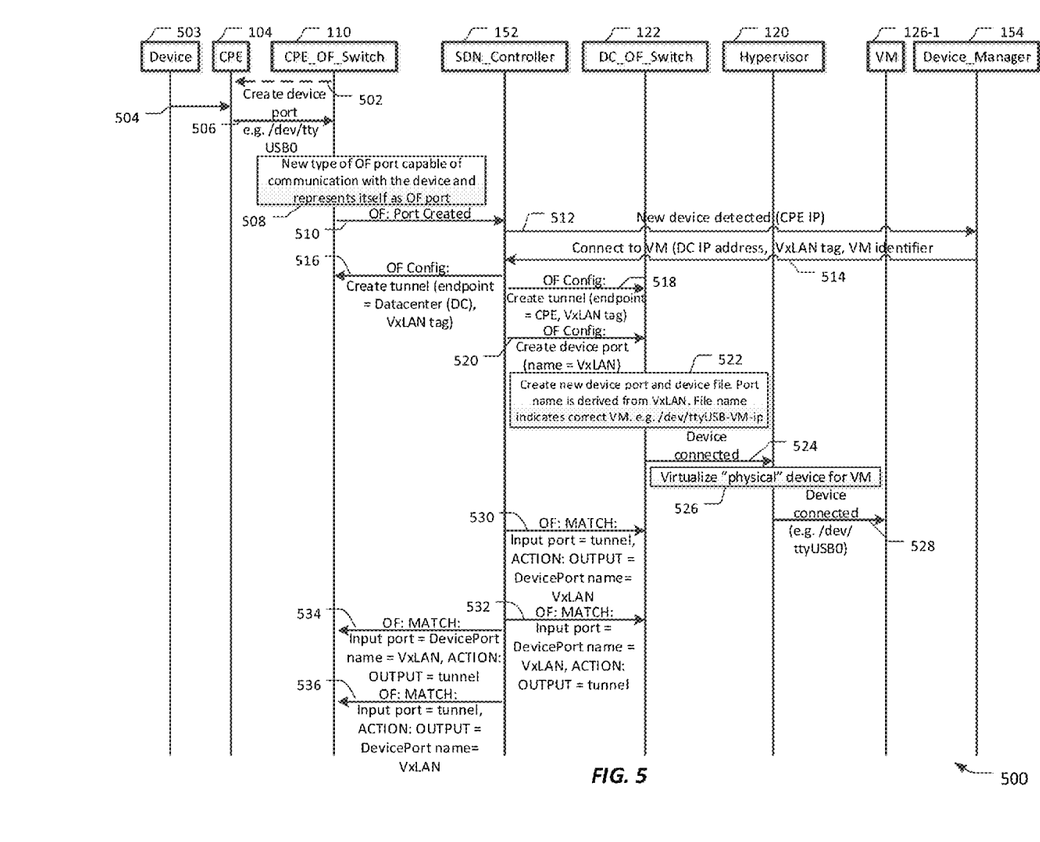
FIG. 5 depicts a message flow diagram for virtualizing a remote device in a data center according to an embodiment of the present patent application.

FIG. 5 depicts a message flow diagram 500 for virtualizing a remote device in a data center according to an embodiment of the present patent application wherein a data center's virtual switch is provided as part of the data center's VMM or hypervisor. By way of illustration, the message flow diagram 500 is representative of an OF-based implementation of device virtualization with respect to data center 116 shown in FIG. 1, described in detail hereinabove. As set forth previously, VS 110 (now referred to as CPE_OF_Switch in FIG. 5) is adapted to monitor for device events occurring at CPE 104 (now adapted for OF implementation), via any suitable monitoring mechanism 502. When a device 503 (e.g., a USB device) is inserted into or otherwise coupled/connected to a physical device port (exemplified by a connection action 504), an indication to create a virtual device port corresponding to the physical device port is made available to CPE_OF_Switch 110, as illustrated by message flow path 506. In response, a new type of virtual device port that represents itself as an OF port may be configured to communicate with the USB device, as exemplified by block 508 wherein the virtual device port is operative to bridge data between the example device file /dev/ttyUSB0 and the OF network. An indication of port creation is made available to SDN_Controller 152 via an OF control flow mechanism 510. A new device detection message 512 is provided to Device_Manager 154 associated with SDN_Controller 152, wherein the CPE's address/identity information (e.g., an IP address) is included. Responsive thereto, Device_Manager 154 returns appropriate tunnel connection information via message flow path 514 that includes the data center's IP address, VM identifier and a VxLAN tag. A plurality of configuration message flows 516, 518 effectuated by SDN_Controller 152 to CPE_OF_Switch 110 and VS 122 of data center 116 (now referred to as DC_ OF_Switch) are operative to establish a data tunnel with suitable endpoints at respective OF switches based on a suitable tunneling technique. In an example implementation where VxLAN is used as the tunneling technique, one tunnel endpoint (TEP) may be based on data center address and VxLAN tag while the other TEP may be based on CPE address and VxLAN tag. Another OF configuration message 520 to DC_OF_Switch 122 is operative to create a new device port and associated device file by or in DC_ OF_Switch 122, wherein the port name may be derived from the VxLAN tag and operative to identify the correct VM, e.g., /dev/ttyUSB-VM-ip, as exemplified in block 522.

Upon obtaining a device creation/connection message 524 from DC_ OF_Switch 122, the associated hypervisor 120 virtualizes the device as a "physical" device for the correct VM 126-1, e.g., /dev/ttyUSB0, thereby allowing access thereto by VM 126-1, as shown at reference numerals 526, 528. After the "physical" device has been virtualized to VM 126-1, SDN_Controller 152 is operative to install or otherwise effectuate a plurality of OF control messages, e.g., Match messages 530/532 to DC_OF_Switch 122 and Match messages 534/536 to CPE_OF_Switch 110, for establishing data traffic flow rules that basically operate to inform the respective OF_Switches what action to take when a packet is received on a particular port (e.g., the one that has been previously created) for causing bidirectional flow in the data forwarding plane of the network.

Figure 6A:
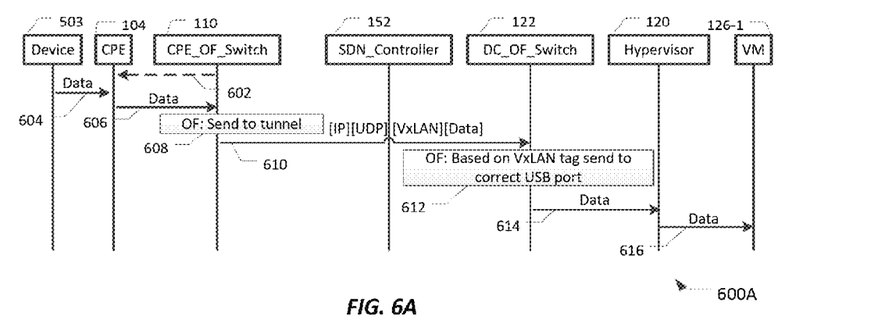
FIGS. 6A and 6B depicts flow diagrams illustrating data transfer between a remote device and the data center of the embodiment shown in FIG. 5.
Figure 6B:
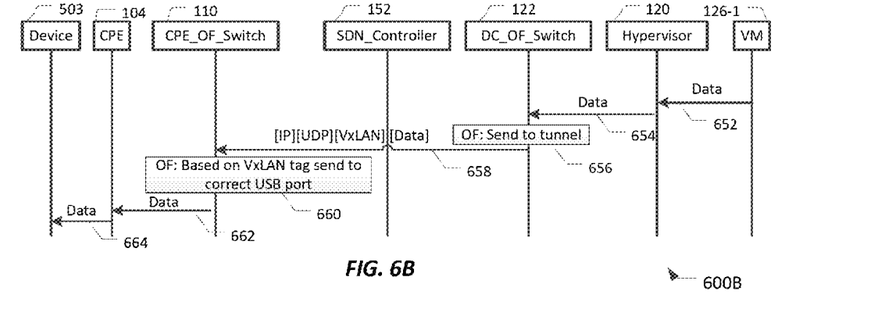

FIGS. 6A and 6B depicts flow diagrams that illustrate data transfer between CPE 104 and the data center of the embodiment shown in FIG. 5. In particular, flow diagram 600A shown in FIG. 6A is illustrative of ingress or read data flow wherein data packets flow from device 503 to an application running on VM 126-1 that consumes the data. Responsive to device event monitoring 602, when the data packets flow from device 503 at CPE 104 as part of a read action 604, CPE_OF_Switch 110 is operative to bridge the data packets at the virtual device port to the data tunnel established by virtue of the message flow of FIG. 5, as shown at reference numerals 606, 608. Responsive thereto, data packets are suitably encapsulated (e.g., [IP][UDP][VxLAN][Data]) for transmission 610 through the data tunnel to the endpoint in DC_OF_Switch 122. As the data packet flow is effectuated via SDN's decoupled forwarding plane, SDN_Controller 152 is bypassed for the actual data transmission. Based on the VxLAN tag information, DC_OF_Switch 122 is operative to send the received packets to the correct USB port, which is accessed by VM 126-1 via hypervisor 120, as shown at reference numerals 612, 614 and 616, for consumption by the appropriate application executing thereon.

FIG. 6B depicts a flow diagram 600A that illustrates data transfer between CPE 104 and VM 126-1 in reverse, i.e., an egress or write data flow wherein data packets flow to device 503 from an application running on VM 126-1 that produces or generates the data. As the generated data packets traverse via hypervisor 120 to DC_OF_Switch 122, as shown at flows 652, 654, the functionality of DC_OF_Switch 122 is operative to encapsulate the packets for transmission through the data tunnel, e.g., [IP][UDP][VxLAN][Data]), to the endpoint in CPE_OF_Switch 110, as shown at reference numerals 656, 658. Based on the VxLAN tag information of the packets, CPE_OF_Switch 110 is operative to send the received packets to the correct USB port for writing to the connected physical device 503, as exemplified at reference numerals 660, 662, 664.

Figure 7:
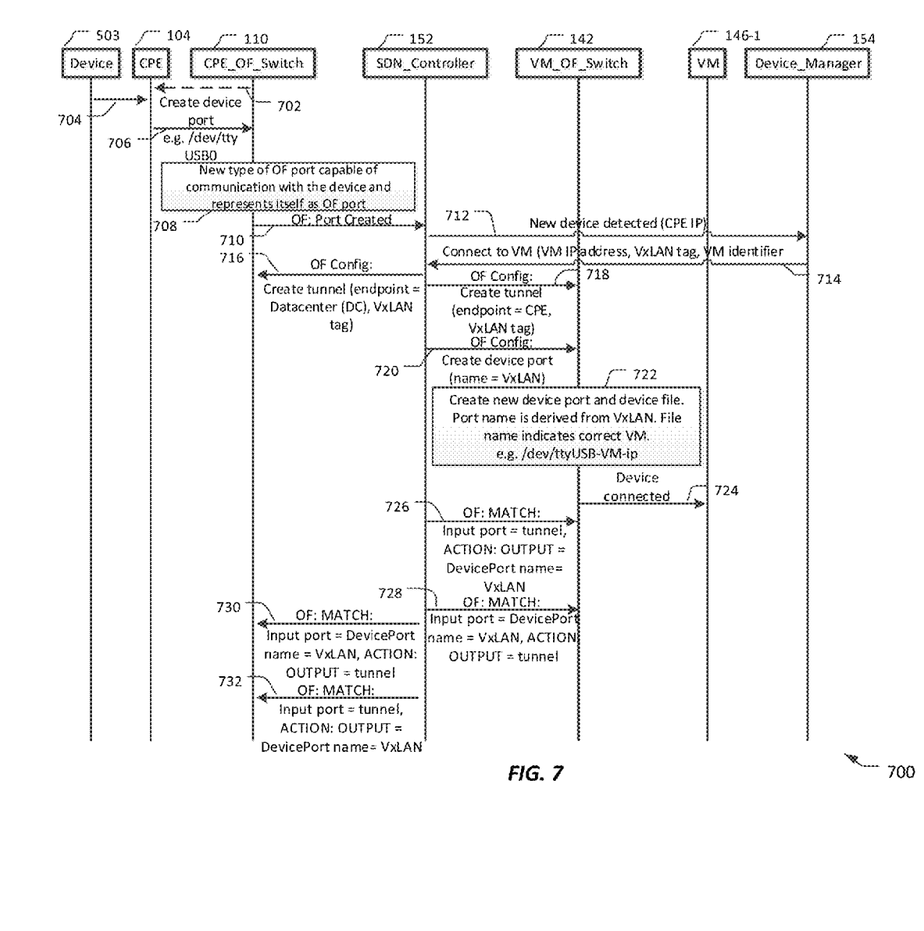
FIG. 7 depicts a message flow diagram for virtualizing a remote device in a data center according to another embodiment of the present patent application.
Figure 8A:
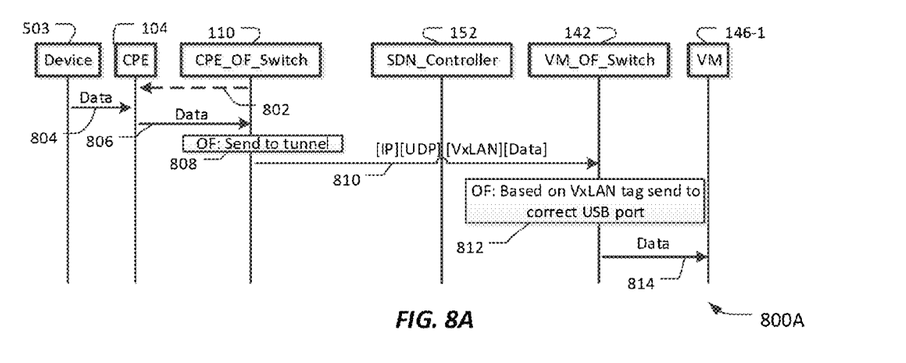
FIGS. 8A and 8B depict flow diagrams illustrating data transfer between a remote device and the data center of the embodiment shown in FIG. 7.
Figure 8B:
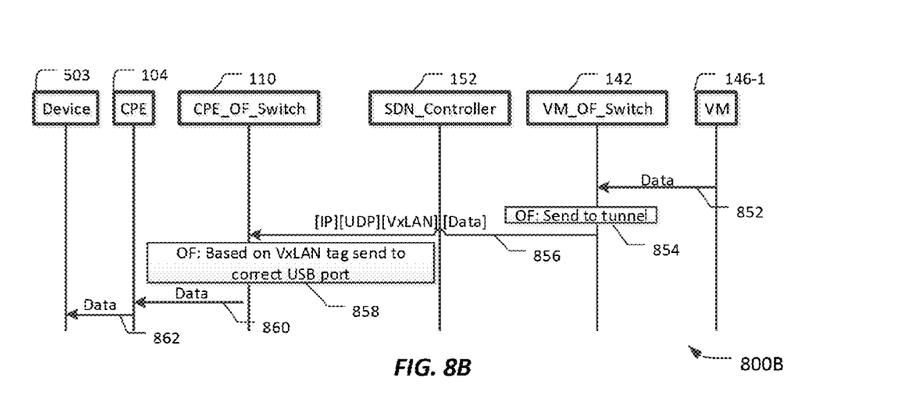

FIG. 7 depicts a message flow diagram 700 for virtualizing a remote device in a data center according to another embodiment of the present patent application wherein a data center's virtual switch is provided as part of a VM rather than the data center's or hypervisor. Similar to the message flow diagram 500 of FIG. 5, the message flow diagram 700 is representative of an OF-based implementation of device virtualization with respect to data center 136 shown in FIG. 1, described in detail hereinabove. Further, FIGS. 8A and 8B depict flow diagrams illustrating data transfer between CPE 104 and the data center of the embodiment shown in FIG. 7. Those skilled in the art should recognize that device port virtualization and data tunnel establishment process of FIG. 7 is essentially similar to the process shown in FIG. 5 except that the functionality of hypervisor 140 of the data center is abstracted out because VS 142 (now referred to as VM_OF_Switch) is executed as part of VM 146-1. Accordingly, tunnel connection information from Device_Manager 154 in the embodiment of FIG. 7 involves, inter alia, the VM's IP address rather than the data center's IP address, as shown in message flow 714. Further, SDN_Controller 152 is operative to generate configuration messages to VM_OF_Switch 142 (instead of DC_OF_Switch 122 shown in the embodiment of FIG. 5). Because VM_OF_Switch 142 is provided as part of VM 146-1, it should be appreciated that interactions between the OVS and the VM need not be explicitly mediated through a hypervisor as shown in FIG. 5. Likewise, both ingress and egress data flows shown in FIGS. 8A and 8B are transparent with respect to the hypervisor. Apart from these differences, the description provided above for FIGS. 5 and 6A-6B is equally applicable to the embodiments exemplified in FIGS. 7 and 8A-8B, mutatis mutandis. As a result, a separate description of features referenced by reference numerals 702-732 in FIG. 7 and reference numerals 802-862 in FIGS. 8A-8B is not set forth herein.

Based upon the foregoing Detailed Description, it should be appreciated that the embodiments of the present disclosure can be deployed to provide a VM access to any physical device attached to the Internet. Further, various shortcomings of the existing technologies, e.g., having to manage and properly control a multitude of different protocols across the networks (such as, IP, UDP, Constrained Application Protocol or CoAP, TCP, HTTP, etc.) may be advantageously overcome.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Moreover, the acts, steps, functions, components or blocks illustrated in a particular flowchart may be inter-mixed or otherwise inter-arranged with the acts, steps, functions, components or blocks illustrated in another flowchart in order to effectuate additional variations, modifications and configurations with respect to one or more implementations for purposes of the present patent disclosure. Moreover, other blocks may be added/inserted between the blocks that are illustrated. Finally, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method operating at a data center implemented as a virtualized environment of one or more virtual machines, the data center operative in a Software Defined Networking (SDN) architecture having an SDN controller, the method for virtualization of a remote customer premises equipment (CPE) client device coupled to the data center via a wide area packet-switched network, the method comprising:
   receiving at a virtual switch of the data center a configuration request from the SDN controller to create a new device port in a particular virtual machine of the data center, the new device port corresponding to an input/output (I/O) port of the remote CPE client device that is monitored by the remote CPE client device's virtual switch;
   responsive to the configuration request, creating the new device port and associated device file, wherein the new device port's name is derived from a tag of a Virtual Extensible Local Area Network (VxLAN) in which the particular virtual machine is logically organized;
   virtualizing the new device port corresponding to the I/O port of the remote CPE client device to the particular virtual machine to appear as connected to the particular virtual machine; and
   providing an application executing on the particular virtual machine with access to the new device port,
   wherein a data tunnel is established through the wide area packet-switched network between the remote CPE client device's virtual switch and the data center's virtual switch, the data tunnel having a first tunnel endpoint based on the remote CPE client device's address and the VxLAN tag and a second tunnel endpoint based on the data center's address and the VxLAN tag.

2. The method as recited in claim 1, wherein the virtual switch of the data center comprises an SDN-compliant virtual switch that is provided as part of a hypervisor effectuating the virtualized environment of the data center.

3. The method as recited in claim 2, wherein the hypervisor is implemented as one of a bare-metal installation and a hosted installation.

4. The method as recited in claim 2, wherein the SDN-compliant virtual switch is operative with at least one of the OpenFlow protocol, Forwarding and Control Element Separation (ForCES) protocol, and OpenDaylight protocol.

5. The method as recited in claim 1, wherein the virtual switch of the data center comprises an SDN-compliant virtual switch that is provided as part of the particular virtual machine of the virtualized environment effectuated by a hypervisor.

6. The method as recited in claim 5, wherein the hypervisor is implemented as one of a bare-metal installation and a hosted installation.

7. The method as recited in claim 5, wherein the SDN-compliant virtual switch is operative with at least one of the OpenFlow protocol, Forwarding and Control Element Separation (ForCES) protocol, and OpenDaylight protocol.

8. The method as recited in claim 1, wherein the I/O port of the remote CPE client device comprises one of a serial port, a parallel port, a Universal Serial Bus (USB) port, a High-Definition Media Interface (HDMI) port, a Digital Visual Interface (DVI) port, a character device port, a block device port, a FireWire port, a Wireless Home Digital Interface (WHDI) port, a game controller port, a sensor port, and a Digital Living Network Alliance (DLNA)-compliant port.

9. The method as recited in claim 8, further comprising detecting whether a device is connected to the I/O port of the remote CPE client device.

10. A system associated with a data center implemented as a virtualized environment of one or more virtual machines, the data center operative in a Software Defined Networking (SDN) architecture, the system being configured for virtualization of a remote customer premises equipment (CPE) client device coupled to the data center, the system comprising:
   an SDN controller including one or more processor circuits and associated non-transitory computer-readable storage media having program instructions for processing an indication received from a virtual switch executing on the remote CPE client device that an SDN-compliant input/output (I/O) port is created at the remote CPE client device;
   a device manager configured to receive a notification from the SDN controller when a new device is detected as coupled to the I/O port at the remote CPE client device, the notification including at least an address of the remote CPE client device; and
   a virtual switch executing at the data center and operating to receive a configuration request from the SDN controller to create a new device port in a particular virtual machine of the data center, the new device port corresponding to the input/output port of the remote CPE client device that is monitored by the remote CPE client device's virtual switch,
   wherein the data center's virtual switch is further operative, responsive to the configuration request, for:
      creating the new device port and associated device file, wherein the new device port's name is derived from a tag of a Virtual Extensible Local Area Network (VxLAN) in which the particular virtual machine is logically organized; and
      virtualizing the new device port corresponding to the I/O port of the remote CPE client device to the particular virtual machine to appear as connected to the particular virtual machine,
   wherein a data tunnel is established through the wide area packet-switched network between the remote CPE client device's virtual switch and the data center's virtual switch, the data tunnel having a first tunnel endpoint based on the remote CPE client device's address and the VxLAN tag and a second tunnel endpoint based on the data center's address and the VxLAN tag, the data tunnel for providing an application executing on the particular virtual machine with access to the input/output port of the remote CPE client device via the virtualized new device port corresponding thereto.

11. The system as recited in claim 10, wherein the virtual switch of the data center comprises an SDN-compliant virtual switch that is provided as part of a hypervisor effectuating the virtualized environment of the data center.

12. The system as recited in claim 11, wherein the SDN-compliant virtual switch is operative with at least one of the OpenFlow protocol, Forwarding and Control Element Separation (ForCES) protocol, and OpenDaylight protocol.

13. The system as recited in claim 11, wherein the hypervisor is implemented as one of a bare-metal installation and a hosted installation.

14. The system as recited in claim 10, wherein the virtual switch of the data center comprises an SDN-compliant virtual switch that is provided as part of the particular virtual machine of the virtualized environment effectuated by a hypervisor.

15. The system as recited in claim 14, wherein the SDN-compliant virtual switch is operative with at least one of the OpenFlow protocol, Forwarding and Control Element Separation (ForCES) protocol, and OpenDaylight protocol.

16. The system as recited in claim 14, wherein the hypervisor is implemented as one of a bare-metal installation and a hosted installation.

17. The system as recited in claim 10, wherein the I/O port of the remote CPE client device comprises one of a serial port, a parallel port, a Universal Serial Bus (USB) port, a High-Definition Media Interface (HDMI) port, a Digital Visual Interface (DVI) port, a character device port, a block device port, a FireWire port, a Wireless Home Digital Interface (WHDI) port, a game controller port, a sensor port, and a Digital Living Network Alliance (DLNA)-compliant port.

* * * * *